United States Patent [19]  [11] 4,433,108
Keppler  [45] Feb. 21, 1984

[54] PREPARATION OF STYRENE SUSPENSION POLYMERS

[75] Inventor: Hans G. Keppler, Weinheim, Fed. Rep. of Germany

[73] Assignee: BASF Aktiengesellschaft, Fed. Rep. of Germany

[21] Appl. No.: 385,271

[22] Filed: Jun. 4, 1982

[30] Foreign Application Priority Data

Jun. 27, 1981 [DE] Fed. Rep. of Germany ....... 3125446

[51] Int. Cl.$^3$ .............................................. C08F 2/18
[52] U.S. Cl. ..................... 525/255; 526/233; 526/346; 525/244
[58] Field of Search .......... 526/346, 233, 201; 525/255, 244; 521/56, 60

[56] References Cited

U.S. PATENT DOCUMENTS

| 2,524,627 | 10/1950 | Hohenstein | 526/346 |
| 2,673,194 | 3/1954 | Grim | 526/346 |
| 3,068,192 | 12/1962 | White | 525/255 |
| 3,819,597 | 6/1974 | Richards | 526/201 |
| 3,919,355 | 11/1975 | Ballova et al. | 525/255 |
| 4,129,706 | 12/1978 | Keppler et al. | 526/346 |
| 4,241,191 | 12/1980 | Keppler et al. | 525/255 |

FOREIGN PATENT DOCUMENTS 690877 4/1953 United Kingdom .

*Primary Examiner*—Paul R. Michl
*Assistant Examiner*—Alex H. Walker
*Attorney, Agent, or Firm*—Keil & Witherspoon

[57] ABSTRACT

A process for the preparation of styrene homopolymers or copolymers by suspension polymerization of monomers which contain dissolved styrene polymers from a preceding suspension polymerization, in the presence of sparingly soluble metal phosphates as suspension stabilizers, wherein, before the polymerization is started, the monomer phase is dispersed in an aqueous phase, containing a dissolved mineral acid, preferably phosphoric acid, at from 10° to 80° C. for from 5 to 120 minutes, after which the sparingly soluble metal phosphate is formed in situ in the aqueous phase. The process is particularly suitable for the preparation of expandable styrene polymers, in which case a volatile blowing agent is added to the suspension before, during or after polymerization.

6 Claims, No Drawings

PREPARATION OF STYRENE SUSPENSION POLYMERS

The invention relates to a process for the preparation of styrene polymers by suspension polymerization in the presence of sparingly soluble metal phosphates as suspension stabilizers.

A suitable process for the preparation of styrene bead polymers is suspension polymerization, in which the monomers are suspended as fine droplets in water and are polymerized at an elevated temperature in the presence of initiators. When this process is carried out industrially, it is essential to use suspension stabilizers to prevent coalescence of the polymerizing monomer droplets.

In industrial practice, the suspension stabilizers used are frequently macromolecular organic compounds which are water-soluble or water-dispersible. Examples are homopolymers or copolymers of vinylpyrrolidone, polymers of acrylic acid, polyvinyl alcohols and cellulose ethers. Pickering dispersants are also employed, these being water-insoluble inorganic compounds described, for example, in Houben-Weyl, Volume XIV/1 (1961), page 420 et seq. Examples of such inorganic compounds are sparingly soluble alkaline earth metal phosphates, carbonates, sulfates and silicates. Phosphates, especially those of calcium, are used most commonly. These inorganic compounds are as a rule employed in combination with small amounts of genuine emulsifiers or surfactants (Houben-Weyl, Volume XIV/1, page 425).

The surfactants employed in these systems are also referred to as extenders, which together with the sparingly soluble inorganic compounds produce a stable suspension of the polymerizing monomer droplets in the aqueous phase. A number of other compounds which act as extenders, for example water-soluble persulfates or sodium bisulfite, have also been disclosed.

The use of inorganic suspension stabilizers, especially in conjunction with extenders, is industrially possible without significant difficulties only if the monomers are polymerized in the absence of dissolved styrene suspension polymers from preceding batches. In investigations with calcium phosphates as suspension stabilizers it has been found that unstable systems, prone to coagulation, are formed if such polymers from preceding batches have been dissolved in the organic phase.

However, the re-use of styrene suspension polymers from preceding polymerization batches, especially the use of sieved-out bead fractions of too high or too low particle diameters, ie. edge fractions, is desirable to save raw material, and on economic grounds. Accordingly, a suspension polymerization process without this capability is of only limited interest.

It is an object of the present invention to provide a process in which the edge fractions, regardless of their bead sizes, can be recycled to the process by dissolving them in the monomers, without such solution leading to instability or other process disadvantages. In investigating this problem I have found that the calcium phosphate present in the recycled beads is the cause of the instability of the system. This instability increases with decreasing particle size of the polymer beads dissolved in the organic phase, especially for polymer beads of diameter less than about 0.4 mm. The phenomenon is particularly pronounced if polymer particles separated from the suspension stabilization effluent, which are referred to as decanter material and have particle diameters mostly less than 0.2 mm, are used. This finding corresponds with the observation that the proportion of, for example, calcium phosphate in the suspension polymers increases with decreasing particle diameter and is greatest for the decanter material. In these explanatory comments it has been assumed that calcium phosphates were employed as the suspension stabilizers.

Accordingly, it appeared advantageous to pretreat these products so as to remove, with acid, the calcium phosphate component, which is principally present at the surface of the beads. A suitable method would be, for example, treatment with nitric acid, either by adding the acid to the complete batch towards the end of a suspension polymerization or by treating the recycled material with nitric acid in a separate process step. Both methods have disadvantages. In the first alternative, which is the less expensive industrially, relatively large amounts of acid are required and the whole of the effluent must be neutralized, leading to an undesirable salt freight. In the second alternative, the acid treatment is admittedly restricted to a minor portion of the product, but additional plant is required, which is relatively expensive, bearing in mind the requisite process steps, namely treatment with acid in a stirred kettle, isolation of the beads (for example in a screen centrifuge), neutralization of the effluent and of the beads, and drying of the beads. In both alternatives, only the surfaces of the polymer beads can be treated; accordingly, only the suspension stabilizers present on the surface and consisting of sparingly soluble metal phosphates can be dissolved off, and not that part of the stabilizers which has become included during suspension polymerization.

Both these methods were tried in the course of developing the present invention and were indeed found effective, but they are not a subject of the present invention because of the serious disadvantages mentioned.

The present invention relates to a process for the preparation of styrene homopolymers and copolymers by polymerization of monomers which contain dissolved styrene suspension polymers, in aqueous suspension in the presence of suspension stabilizers consisting of sparingly soluble metal phosphates, wherein the sparingly soluble metal phosphates contained in the dissolved material are transferred to the aqueous phase by dispersing the monomer phase, before starting the polymerization, in an aqueous phase, containing a dissolved mineral acid, by stirring at from 10° to 80° C., preferably from 20° to 50° C., for from 5 to 120 minutes, preferably from 20 to 60 minutes, this constituting an extractive acid treatment. Thereafter, the sparingly soluble metal phosphate which acts as the suspension stabilizer is formed in the aqueous phase, or is added.

In a preferred embodiment, phosphoric acid is used as the mineral acid and the suspension stabilizer is formed in situ in the aqueous phase by adding a metal compound and precipitating the sparingly soluble metal phosphate. The latter can be formed by adding the requisite amount of alkali metal hydroxide or ammonium hydroxide and the appropriate proportion of a water-soluble metal compound, or by adding an appropriate amount of a metal oxide, hydroxide or carbonate. The process according to the invention can also be carried out by producing sparingly soluble metal phosphates in combination, part of the total amount being prepared from phosphoric acid in the manner described above while the remainder is produced in a conventional manner, for example from trisodium phosphate and calcium chloride, or is added as a suitable previously prepared calcium phosphate. Another feasible variant of the novel process is to effect the extractive acid treatment not with phosphoric acid but with another mineral acid which dissolves calcium phosphates, then to neutralize the acid, and thereafter to prepare the sparingly soluble metal phosphates direct in the aqueous phase in a conventional manner, for example from water-soluble phosphates and metal compounds, or to add separately prepared metal phosphate.

The amount of mineral acid used can vary within wide limits and be suited to each individual case. Preferably, it is 0.015–0.4, especially 0.04–0.2, % by weight, based on suspension. The suspension in that case contains 0.005–1, preferably 0.1–0.5, % by weight of suspension stabilizer.

The process according to the invention can be carried out in combination with conventional embodiments of suspension polymerization. Usually, extenders are employed as co-stabilizers. These are, as a rule, emulsifiers or surfactants, examples being sodium dodecyl-sulfonate, sodium octyl-sulfate, sodium dioctyl sulfosuccinate, alkali metal lauryl-sulfates and alkali metal salts of fatty acids. Examples of other extenders which can be used are small amounts of polymer dispersions, water-soluble persulfates or sodium bisulfite.

The suspension stabilizers are sparingly soluble metal phosphates, for example phosphates of calcium, barium, strontium, magnesium, aluminum, iron or cobalt. In certain cases, a combination of these with one another and/or with minor proportions of other sparingly soluble compounds, such as hydroxides, oxides, carbonates, silicates or sulfates, may be useful.

Sparingly soluble phosphates of divalent metals, especially calcium phosphates, are preferred. Amongst these, salts with 3 base equivalents, or mixtures of products with more than 3 base equivalents and products with less than 3 base equivalents, are more especially preferred. Examples of preferred phosphate compounds are tricalcium phosphate, hydroxyapatite and other phosphates having an apatite lattice structure.

The particle sizes of the sparingly soluble metal compounds can vary within wide limits, namely be from 0.01 to 100 $\mu$m, depending on their method of preparation and their form; in the case of hydroxyapatites, the preferred particle size is in the main from 0.01 to 0.1 $\mu$m.

The process according to the invention is suitable for the preparation of styrene homopolymers and for copolymerizing monomer mixtures containing not less than 50% by weight of styrene. Suitable comonomers include acrylonitrile, esters of acrylic acid or methacrylic acid with alcohols of 1 to 8 carbon atoms, N-vinyl compounds, eg. vinylcarbazole, and also small amounts of compounds with two double bonds, eg. butadiene, divinylbenzene and butanediol diacrylate. The monomers contain, in solution, styrene polymers from a preceding suspension polymerization, preferably in an amount of from 2 to 10% by weight.

In the process according to the invention, the polymers are obtained in the form of fine beads. If the suspension polymerization is carried out in the presence of a volatile organic blowing agent, expandable bead polymers are obtained. The blowing agent can be added to the suspension before, during or after polymerization. Suitable blowing agents are hydrocarbons which are gaseous or liquid under normal conditions, do not dissolve the styrene polymer, and boil below the softening point of the polymer.

Examples of preferred blowing agents are propane, butane, pentane, cyclopentane, hexane, cyclohexane and halohydrocarbons eg. methyl chloride, dichlorodifluoromethane or trifluorochloromethane, as well as mixtures of these. The blowing agents are mostly used in amounts of from 3 to 12% by weight, based on monomers.

The polymerization is started with organic polymerization initiators which when heated decompose into free radicals which trigger the polymerization. Examples of commonly used initiators are peroxides, eg. benzoyl peroxide, lauroyl peroxide, tert.-butyl perbenzoate, tert.-butyl peroctoate and tert.-butyl perpivalate, and unstable azo compounds, eg. azodiisobutyronitrile. The initiators are generally employed in amounts of from 0.01 to 1% by weight, based on monomers. The type of initiator used depends on the envisaged polymerization temperature. It is particularly advantageous to use mixtures of initiators, in which case the polymerization temperature can be matched to the half-life of the initiator. The polymerization temperature is as a rule from 60° to 150° C., preferably from 80° to 120° C.

Especially in the case of expandable polystyrene beads, the processing characteristics greatly depend on the cell structure. The cell structure, which can be characterized by, for example, stating the number of cells per mm$^3$, may be controlled by use of conventional cell regulators.

To obtain flame-retardant styrene polymers it is necessary to have flameproofing agents, which are often added from the start, ie. to the suspension polymerization reaction mixture. Organic halogen compounds, preferably bromine compounds, are especially suitable, examples being hexabromocyclododecane and tris-(dibromopropyl) phosphate. The polymerization batch may also contain organic or inorganic fillers, antistatic agents or plasticizers.

EXAMPLES (A) The organic phase, in the Examples described below, contains, per 100 parts by weight of monomers, 6 parts of finely divided material for dissolution, from a preceding suspension polymerization, as well as dibenzoyl peroxide and t-butyl perbenzoate as polymerization initiators.

(B) The aqueous suspension polymerization phase consists of 100 parts of water and inorganic suspension stabilizers which are contained therein and whose preparation is described in the individual examples.

(C) The suspension polymerization of the mixture of phases A and B is carried out in a conventional manner in the presence of a sodium alkylsulfonate as an extender and of pentane as a blowing agent, at from 85° to 115° C.

(D) The various types of extractive acid treatment of the organic phases containing finely divided material for dissolution are explained in the Examples.

(E) Comparative experiment.

EXAMPLE 1

A$_1$: 100 parts by weight of styrene. Sieve analysis of the material for dissolution:

| ∅ mm | >0.4 | 0.31 | 0.2 | <0.2 |
|---|---|---|---|---|
| % | 5 | 72 | 17 | 6 |

B$_1$: 100 parts by weight of water.

$D_1$: 1.19 parts by weight of 3 N phosphoric acid are added to the suspension of $A_1$ and $B_1$. The suspension is stirred for 30 minutes at room temperature and thereafter 1.19 parts by weight of 3 N sodium hydroxide solution, followed by 1.10 parts by weight of a 20% strength calcium chloride solution, are added. The suspension polymerization C is then initiated. Foamable beads are obtained.

EXAMPLE 2

$A_2$ and $B_2$ as in Example 1.

$D_2$: Like $D_1$, but instead of sodium hydroxide solution and calcium chloride solution, 0.55 part by weight of a 20% strength calcium hydroxide solution is added.

EXAMPLE 3

Magnesium phosphate as suspension stabilizer.

$A_3$ and $B_3$ as in Example 1.

$D_3$: Like $D_1$, but instead of calcium chloride 0.94 part by weight of a 20% strength magnesium chloride solution is added.

EXAMPLE 4

(Extractive acid treatment with sulfuric acid in the suspension batch)

$A_4$ and $B_4$ as in Example 1.

$D_4$: Similar to $D_1$, but instead of phosphoric acid, 1.88 parts by weight of 2 N sulfuric acid are added. After 45 minutes' stirring at room temperature, the sulfuric acid is neutralized by adding sodium hydroxide solution. 1.96 parts by weight of a 10% strength $Na_3PO_4$ solution are then added, followed by 1.47 parts by weight of a 20% strength calcium chloride solution.

EXAMPLE 5

(Extractive acid treatment with hydrochloric acid in the suspension batch)

$A_5$ and $B_5$ as in Example 2.

$D_5$: Like $D_1$, but instead of sulfuric acid 1.4 parts by weight of 1 N hydrochloric acid are added.

EXAMPLE 6

(E) (Comparative experiment without extractive acid treatment)

The organic phase has the composition described under A. The aqueous phase consists of 100 parts by weight of water and the calcium phosphate suspension stabilizer is prepared by adding 1.96 parts by weight of a 10% strength $Na_3PO_4$ solution followed by 1.47 parts by weight of a 20% strength calcium chloride solution. The remaining conditions of the experiment are as described under C. It is impossible to obtain a stable batch, and coagulation occurs from 1 to 2.5 hours after 80° C. is reached.

I claim:

1. A suspension polymerization process for the preparation of polymeric beads of homopolymers of styrene or styrene copolymers which consist predominantly of styrene, wherein styrene polymers from previous suspension polymerization batches are used along with fresh styrene monomer, which process comprises:
    (a) dissolving styrene polymers from previous polymerization batches in styrene monomer to form a monomer phase, said polymers containing sparingly soluble metal phosphate suspension stabilizers;
    (b) dissolving phosphoric acid in water to form an aqueous phase;
    (c) dispersing the monomer phase in the aqueous phase by stirring at a temperature of from 10° to 80° C. for from 15 to 120 minutes to transfer the metal phosphate suspension stabilizers to the aqueous phase of the dispersion whereby the metal phosphate is dissolved in the aqueous phase;
    (d) adding to the dispersion a metal compound to form a sparingly soluble metal phosphate suspension stabilizer by precipitation; and
    (e) heating the dispersion containing the precipitated metal phosphate to initiate the suspension polymerization process.

2. The process of claim 1, wherein the sparingly soluble metal phosphate is present in the aqueous suspension in an amount of from 0.05 to 1% by weight.

3. The process of claim 2, wherein the sparingly soluble metal phosphate is a calcium phosphate.

4. The process of claim 1, for the preparation of expandable styrene polymers, wherein a volatile organic blowing agent is added to the suspension before, during or after polymerization.

5. The process of claim 1, wherein the metal compound added in step (d) is a metal oxide, hydroxide or carbonate.

6. The process of claim 5, wherein the metal is calcium.

* * * * *